US011962107B2

(12) United States Patent
Grant

(10) Patent No.: US 11,962,107 B2
(45) Date of Patent: Apr. 16, 2024

(54) ELECTRICAL CONNECTOR ASSEMBLY WITH PLUG AND CAVITY ASSEMBLY AND METHOD OF ULTRASONICALLY WELDING

(71) Applicant: Yazaki North America, Inc., Canton, MI (US)

(72) Inventor: Mark S. Grant, White Lake, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 17/700,189

(22) Filed: Mar. 21, 2022

(65) Prior Publication Data

US 2022/0216639 A1 Jul. 7, 2022

Related U.S. Application Data

(63) Continuation of application No. 15/983,774, filed on May 18, 2018, now Pat. No. 11,283,211.

(51) Int. Cl.
*H01R 13/443* (2006.01)
*H01R 13/41* (2006.01)
(Continued)

(52) U.S. Cl.
CPC ........... *H01R 13/443* (2013.01); *H01R 13/41* (2013.01); *H01R 13/504* (2013.01); *H01R 13/5213* (2013.01); *H01R 43/005* (2013.01)

(58) Field of Classification Search
CPC ........ H01R 4/22; H01R 4/70; H01R 13/5202; H01R 13/5205; H01R 13/443;
(Continued)

(56) References Cited

U.S. PATENT DOCUMENTS 4,105,278 A * 8/1978 Braund ................ H01R 13/504 439/497
4,640,567 A * 2/1987 Lundergan ......... H01R 13/5221 439/282
(Continued)

FOREIGN PATENT DOCUMENTS

EP 3 236 537 10/2017
JP H07-122331 A 5/1995
(Continued)

OTHER PUBLICATIONS

Extended European Search Report for EP App. No. 19172591.0, dated Oct. 10, 2019, 7 pages.

*Primary Examiner* — Thanh Tam T Le
(74) *Attorney, Agent, or Firm* — FOLEY & LARDNER LLP

(57) ABSTRACT

An assembly includes a plug at least partially disposed in a cavity of a connector at a front end of the connector. The plug ultrasonically welded to the connector in a configuration. The plug includes an inset portion and a recess formed within the inset portion. The inset portion extends axially into a body of the plug. The recess has a first closed surface forming an outer surface and configured to engage with a tool for aligning the plug with the cavity. The plug encloses the cavity with a second closed surface, such that the cavity is free from receiving a terminal or an electrical wire in the configuration.

19 Claims, 5 Drawing Sheets

(51) Int. Cl.

| | |
|---|---|
| ***H01R 13/504*** | (2006.01) |
| ***H01R 13/52*** | (2006.01) |
| ***H01R 43/00*** | (2006.01) |

(58) Field of Classification Search

CPC .. H01R 13/41; H01R 13/504; H01R 13/5213; H01R 43/005

See application file for complete search history.

(56) References Cited

U.S. PATENT DOCUMENTS

| | | | | |
|---|---|---|---|---|
| 4,707,043 | A | 11/1987 | Reed | |
| 5,273,456 | A | 12/1993 | Muzslay | |
| 5,470,258 | A | 11/1995 | Suzuki et al. | |
| 5,533,912 | A * | 7/1996 | Fillinger | H01R 13/5213 439/718 |
| 5,542,852 | A | 8/1996 | Hsueh | |
| 5,551,892 | A | 9/1996 | Endo et al. | |
| 5,573,412 | A | 11/1996 | Anthony | |
| 5,658,168 | A | 8/1997 | Myer et al. | |
| 5,720,629 | A | 2/1998 | Self et al. | |
| 5,730,626 | A | 3/1998 | Tomita et al. | |
| 5,813,882 | A | 9/1998 | Saito et al. | |
| 5,967,829 | A | 10/1999 | Shinchi | |
| 6,290,521 | B1 | 9/2001 | Suzuki et al. | |
| 6,341,983 | B1 * | 1/2002 | Crawford | H01R 13/5208 439/275 |
| 6,416,337 | B1 | 7/2002 | Fan | |
| 6,494,731 | B1 | 12/2002 | Suzuki | |
| 6,595,800 | B2 * | 7/2003 | Yuasa | H01R 13/5208 439/588 |
| 6,672,911 | B2 | 1/2004 | Zhao et al. | |
| 7,094,094 | B2 | 8/2006 | Zahnen et al. | |
| 7,144,279 | B2 | 12/2006 | Zahnen et al. | |
| 7,156,698 | B2 | 1/2007 | Yamashita | |
| 7,220,137 | B1 | 5/2007 | Liu | |
| 7,338,304 | B2 | 3/2008 | Kameyama et al. | |
| 7,351,102 | B2 | 4/2008 | Cykon et al. | |
| 7,717,740 | B2 | 5/2010 | Zahnen et al. | |
| 7,896,665 | B2 | 3/2011 | Parrish | |
| 7,927,119 | B2 | 4/2011 | Zahnen et al. | |
| 8,087,948 | B2 | 1/2012 | Ambo et al. | |
| 8,112,879 | B2 * | 2/2012 | Morrison | H01R 13/5213 29/764 |
| 8,647,132 | B2 | 2/2014 | Kuroda et al. | |
| 8,672,694 | B2 * | 3/2014 | Lee | H01R 13/443 439/133 |
| 9,040,822 | B2 | 5/2015 | Nieto Lopez | |
| 11,283,211 | B2 * | 3/2022 | Grant | H01R 13/504 |
| 2005/0179209 | A1 | 8/2005 | Kobayashi | |

FOREIGN PATENT DOCUMENTS

| | | |
|---|---|---|
| JP | 2005-021939 A | 1/2005 |
| JP | 2005-294146 A | 10/2005 |
| JP | 2017-073204 A | 4/2017 |

* cited by examiner

ELECTRICAL CONNECTOR ASSEMBLY WITH PLUG AND CAVITY ASSEMBLY AND METHOD OF ULTRASONICALLY WELDING

CROSS REFERENCE TO RELATED PATENT APPLICATION

This application is a Continuation of U.S. patent application Ser. No. 15/983,774, filed May 18, 2018, the disclosure of which is incorporated herein by reference in its entirety.

BACKGROUND

This application relates generally to the field of wire electrical connectors and more specifically to plugs for sealing cavities in electrical connectors with an ultrasonic weld.

Automobiles may contain a large number of wires for connecting various electrical components. These wires are generally grouped in wire harnesses, which utilize electrical connectors to enable operators to quickly and easily electrically connect the components (e.g., forming wired connections with a male and female connector assembly) during assembly of the automobile. Each component may have a different number of wires that must be inserted into corresponding cavities in a multi-prong connector or connectors. As a result, when a standardized electrical connector is used for various components, each having a different number of wires, some of the cavities may remain unfilled with wires and exposed to the elements. Exposure of the wired electrical connection through the unfilled cavities may lead to damage or malfunction of the electrical connector assembly. For example, moisture entering the electrical connector assembly through the unfilled cavities may short circuit the wired connections and cause the electrical components to malfunction. Similarly, debris entering the electrical connector assembly through an unfilled cavity may interfere with the wired connections.

In order to protect the wired connections in the electrical connector assembly, the electrical connector assembly may be sealed, such that an interior portion of the assembly is isolated from outside elements. A plug may be inserted into any unfilled cavity to cover and protect the cavity. However, in a conventional electrical connector assembly, the plug does not positively engage the cavity and is therefore susceptible to fall out of the cavity as a result of vibrations or movement of the assembly over the life of the automobile. Alternatively, plugs that do positively engage the electrical connector include excess structure, which greatly increases the material cost of the electrical connector assembly.

It would therefore be advantageous to provide a plug to seal a cavity in an electrical connector, such that the plug both positively engages the cavity and minimizes material use by ultrasonically welding the plug in the cavity.

SUMMARY OF THE INVENTION

One embodiment relates to an assembly, including a plug at least partially disposed in a cavity of a connector at a front end of the connector. The plug ultrasonically welded to the connector in a configuration. The plug includes an inset portion and a recess formed within the inset portion. The inset portion extends axially into a body of the plug. The recess has a first closed surface forming an outer surface and configured to engage with a tool for aligning the plug with the cavity. The plug encloses the cavity with a second closed surface, such that the cavity is free from receiving a terminal or an electrical wire in the configuration.

Another embodiment relates to a connector assembly, including a plug at least partially disposed in a cavity of a connector at a front end of the connector. The plug ultrasonically welded to the connector in a configuration. The plug includes a first end, a second end opposite the first end, and a cap. The first end is at least partially disposed in the cavity of the connector. The cap is formed at the second end and extends annularly outward from the body. The cavity includes a receiving portion formed from a receiving wall defining a receiving portion diameter.

Another embodiment relates to a method of assembling an electrical connector assembly, the method including providing a connector defining a front end, an opposing rear end, and a cavity defined in the connector and extending from the front end to the rear end. The method further includes inserting a plug at least partially into the cavity, and ultrasonically welding the plug to the connector.

DETAILED DESCRIPTION

Referring to the FIGURES generally, an electrical connector assembly is shown according to various embodiments. The connector assembly is configured to provide a male and female connection between two corresponding connectors, each receiving a plurality of wires for connection. As will be discussed in further detail below, an unfilled cavity (e.g., a cavity that does not receive a wire therein) may be filled with a plug to fully enclose an interior portion of the connector assembly to protect the wired connections in the interior portion.

Figure 1:
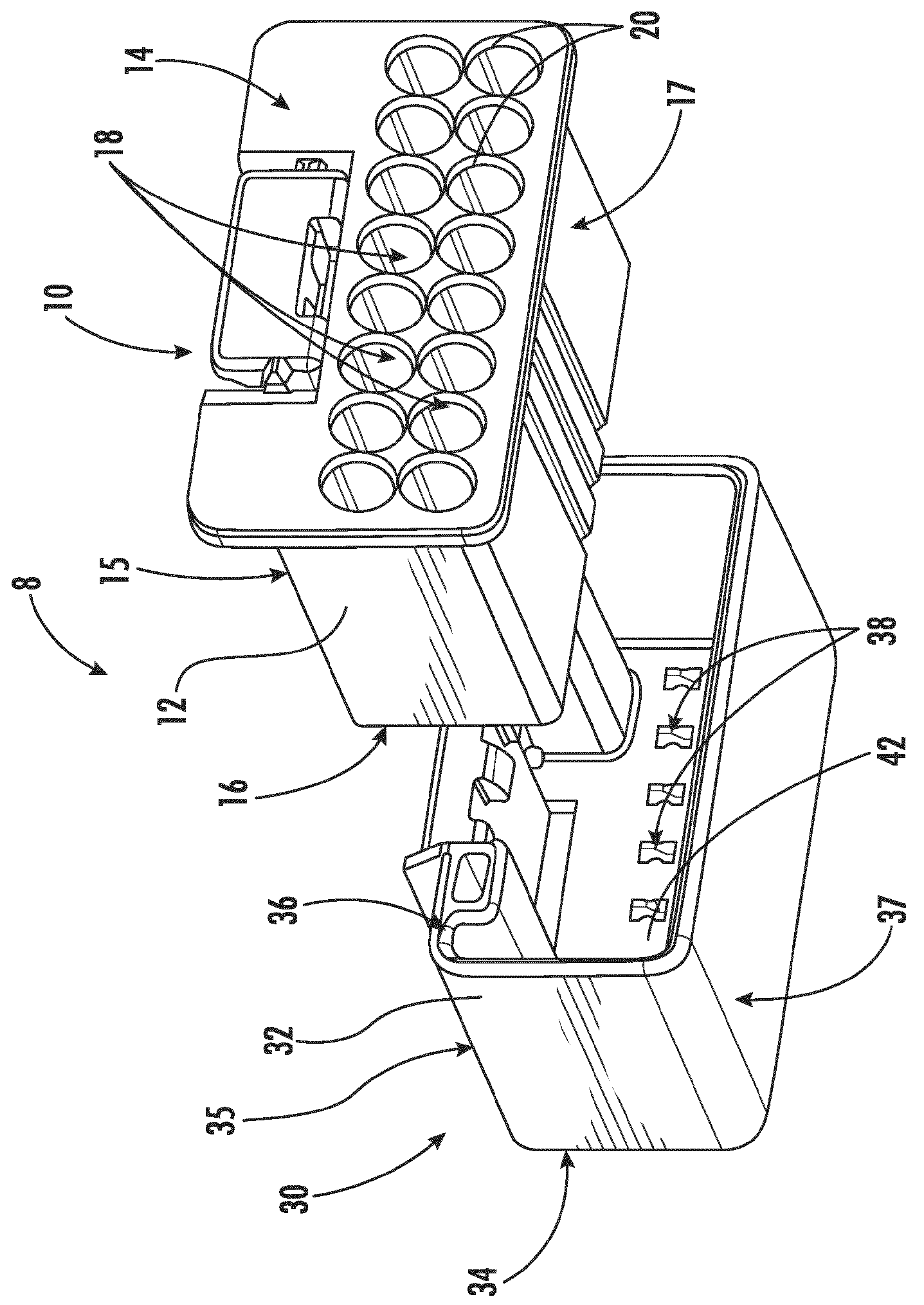
FIG. 1 is a perspective view of a connector assembly.

Referring now to FIG. 1, an electrical connector assembly 8 is shown according to one embodiment. The connector assembly 8 includes a first connector 10 (i.e., a connector, an electrical connector, etc.), having a substantially rectangular body 12 defining a front (i.e., first) end 14 and an opposing rear (i.e., second) end 16. The body 12 further defines an upper surface 15 and an opposing lower surface 17. It should be noted that while FIG. 1 shows the first connector 10 with a rectangular body 12, according to other embodiments, the body 12 may define other shapes. A plurality of cavities 18 are formed in the front end 14 and extend longitudinally through the body 12 to the rear end 16. Specifically, each cavity 18 defines a front opening 20 formed in the front end 14 of the body 12 and an opposing rear opening 22 (shown in FIG. 2) formed in the rear end 16 of the body 12.

Each cavity 18 is configured to receive a metal terminal (not shown) therein and an exposed end of a wire in the terminal for passing electricity from the wire to the terminal at the rear end 16. For example, the metal terminal may include a portion that is crimped onto the exposed end of the wire or electrically coupled to the wire in other suitable ways (e.g., soldered, welded, wound, etc.). The terminal is then inserted through the front end 14 of the first connector 10 into a cavity 18 by passing at least a portion of the terminal through the front opening 20 of the cavity 18. When the terminal is fully inserted into and secured within the cavity 18, at least a portion of the terminal is disposed proximate the rear end 16 of the body 12 or extends outward from the body 12 through the corresponding rear opening 22 at the rear end 16 (e.g., away from the front end 14). The terminal may be retained within the cavity 18 with an interference fit or press fit by the terminal against walls forming the cavity 18, although the terminal may be retained in place in the cavity 18 in other ways.

According to another embodiment, the terminal may be inserted into the cavity 18 and then the end of the wire may be subsequently received in and electrically coupled to the terminal, as described above. According to yet another embodiment, the exposed end of the wire may be received in the cavity 18 without a terminal disposed in the cavity 18 between the wire and the walls of the cavity 18. In this configuration, the wire may be coupled directly to the cavity 18 or another portion of the connector assembly 8.

Referring still to FIG. 1, the connector assembly 8 further includes a second connector 30, which is configured to electrically engage the first connector 10. The second connector 30 may be substantially similar to the first connector 10, including a substantially rectangular body 32 defining a front (i.e., first) end 34 and an opposing rear (i.e., second) end 36. The body 32 further defines an upper surface 35 and an opposing lower surface 37. It should be noted that while FIG. 1 shows the second connector 30 with a rectangular body 32, according to other embodiments, the body 32 may define other shapes, such that the shape of the body 32 corresponds to the shape of the body 12 of the first connector 10. Specifically, the connector assembly 8 may be configured with a female component and a male component configured to be received in the female component. For example, one of the first or second connectors 10, 30 may be configured as a male component, which is configured to be received in the other of the first or second electrical connectors 10, 30, which may be configured as a female component.

As shown in FIG. 1, the second connector 30 includes a plurality of cavities 38 formed in the front end 34 and extending laterally through the body 32 to the rear end 36. The cavities 38 may be substantially similar to or the same as the cavities 18 in the first connector 10, as discussed above. Each cavity 38 may define a front opening (not shown) formed in the front end 14 of the body 12 and an opposing rear opening 42 formed in the rear end 36 of the body 32. When the connector assembly 8 is in the assembled configuration, the rear end 16 of the first connector 10 may be disposed against and receive or be received in a portion of the rear end 36 of the second connector 30. In the connector assembly 8, terminals and/or wires extending through the cavities 18 in the first connector 10 may contact and therefore electrically engage corresponding terminals and/or wires in the second connector 30 for transmitting electricity between the wires in the first and second connectors 10, 30.

Referring still to FIG. 1, the plurality of cavities 18 may be organized in a grid formed in the front end 14 of the body 12. It should be noted that while FIG. 1 shows a grid having two rows of eight cavities 18, this grid represents one embodiment and that the first connector 10 may include more or fewer cavities 18 in the body 12, including with more or fewer rows and/or columns of cavities 18. Furthermore, according other embodiments, the cavities 18 may be formed without a rectangular grid pattern and may be formed in a grid having other shapes or with no grid at all.

The second connector 30 may define the cavities 38 in a grid substantially the same as the cavities 18 in the first connector 10, such that the rear opening 22 of each cavity 18 in the first connector 10 is configured to align with a corresponding rear opening 42 of each cavity 38 in the second connector 30 when the connector assembly 8 is fully assembled. However, in a configuration in which the grids are not both laterally and vertically symmetrical, the grid of the cavities 38 on the front end 34 of the second connector 30 may be substantially the same as the grid of the cavities 18 on the front end 14 of the first connector 10 transposed about one or both of a lateral or vertical axis defined coplanar with the front end 14 of the first connector 10.

According to one embodiment, the second connector 30 may include a different number of cavities 38 than the number of cavities 18 in the first connector 10. For example, the second connector 30 may include fewer cavities 38 than in the first connector 10. In this configuration, cavities 18 in the first connector 10 without corresponding cavities 38 in the second connector 30 may be filled with plugs, as discussed in further detail below. Similarly, the first connector 10 may include fewer cavities 18 than in the second connector 30. In this configuration, cavities 38 in the second connector 30 without corresponding cavities 18 in the first connector 10 may be filled with plugs. In either configuration, the first and second connectors 10, 30 may be configured to receive the same number of electrical wires therein.

Referring to FIGS. 2-5 generally, a first connector 10 in a connector assembly 8 is shown according to various embodiment. It should be noted, however, that while FIGS. 2-5 show the connector as the first connector 10, the second connector 30 may be configured in substantially the same way as the first connector 10 and the male or female configuration of the connector 10, 30 does not limit the use of a plug to seal a corresponding cavity 18 therein. Further, while FIGS. 2-5 only show one plug it should be understood that at least one plug may be provided to correspond with each unfilled cavity 18, as well as in corresponding unfilled cavities 18 in the second connector 30.

Figure 2:
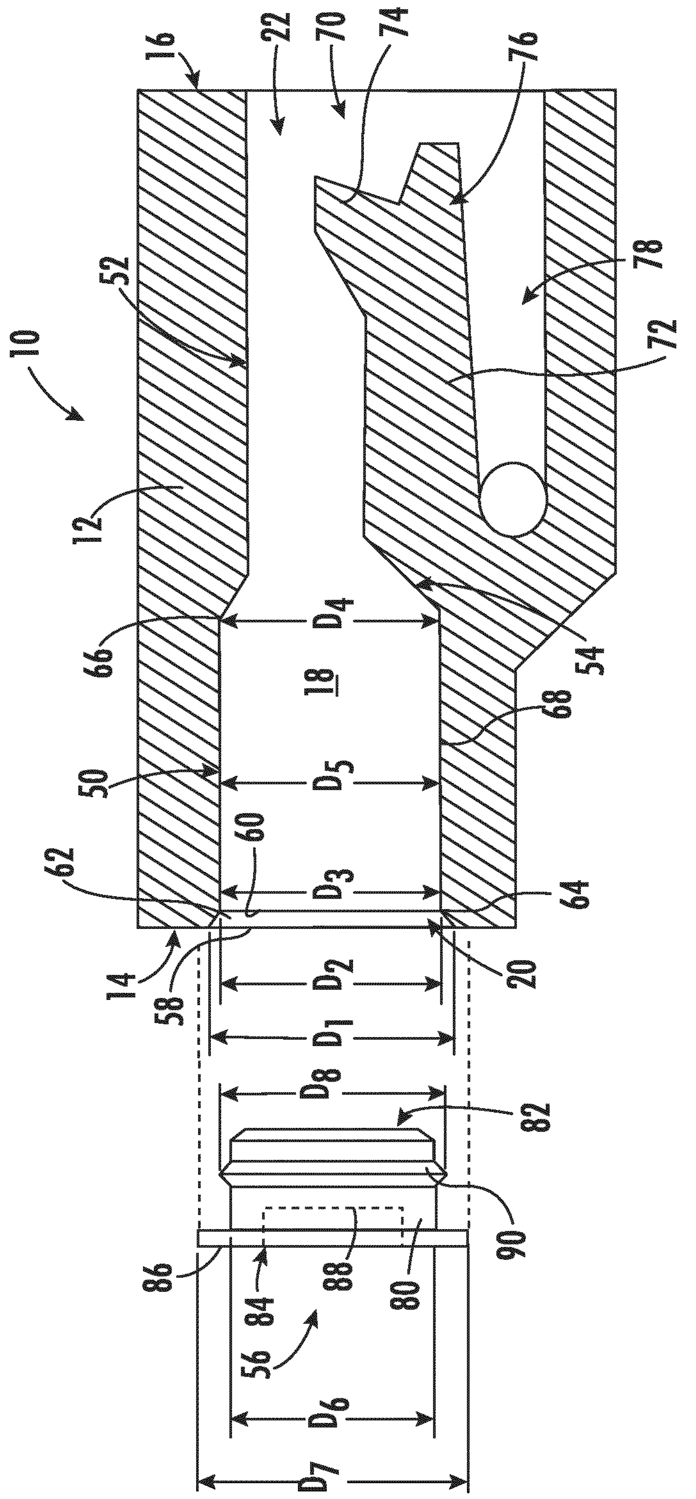
FIG. 2 is an exploded cross-sectional view of a connector according to one embodiment, including a plug for sealing the connector.

Referring now to FIG. 2, an exploded cross-sectional view of a first connector 10 is shown according to one embodiment. The cavity 18 defines a receiving portion 50 (i.e., a first portion) formed proximate the front opening 20, a connecting portion 52 (i.e, a second portion) formed proximate the rear opening 22, and a transition portion 54 (i.e., a third portion) extending therebetween. The receiving portion 50 is configured to receive and secure a plug 56 therein for sealing the cavity 18 at the front opening 20. The connecting portion 52 is configured to engage and secure at least one of a terminal or a wire in place for electrical connection with the second connector 30.

The front opening 20 defines a front edge 58 and an opposing rear edge 60 and a surface 62 extending therebetween. The surface 62 decreases in diameter and/or cross-sectional area moving away from the front end 14 toward the rear end 16. For example, the front edge 58 defines a front diameter $D_1$ (i.e., a first diameter) and the rear edge 60 defines a rear diameter $D_2$ (i.e., a second diameter), which is less than the front diameter $D_1$. As shown in FIG. 2, the surface 62 defines a substantially linear cross-sectional profile, forming a chamfer between the front edge 58 and the rear edge 60. However, according to other embodiments the surface 62 may define other cross-sectional profiles (e.g., fillet or other curved surface) or may be threaded. According to another embodiment, the front diameter $D_1$ may be substantially the same as the rear diameter $D_2$, such that the front opening 20 defines a substantially constant cross-sectional area between the front edge 58 and the rear edge 60. In the configuration shown in FIGS. 1 and 2, the front opening 20 has a substantially circular profile, although it should be recognized that the front opening 20 may define other shapes corresponding to a shape of the plug 56.

The receiving portion 50 extends from the rear edge 60 of the front opening 20, away from the front end 14 and toward the connecting portion 52 and the rear end 16. The receiving portion 50 defines a front edge 64 and an opposing rear edge 66 and a receiving wall 68 (i.e., a wall, a surface, etc.) extending therebetween. The front edge 64 defines a front diameter $D_3$ (i.e., a third diameter) and the rear edge 66 defines a rear diameter $D_4$ (i.e., a fourth diameter). The receiving portion 50 defines a receiving diameter $D_5$ (i.e., a fifth diameter) between the front edge 64 and the rear edge 66, which is substantially constant and is substantially the same as the front diameter $D_3$ and/or the rear diameter $D_4$. As shown in FIG. 2, the receiving diameter $D_5$ is substantially the same as the rear diameter $D_2$ of the front openings 20, such that cavity 18 defines a constant diameter and cross-sectional area between the rear edge 60 of the front opening 20 and the rear edge 66 of the receiving portion 50. In the configuration shown in FIGS. 1 and 2, the receiving portion 50 is annular in shape and has a substantially circular profile, although it should be recognized that the receiving portion 50 may define other shapes corresponding to the plug 56, such that the receiving portion 50 defines substantially the same profile as the plug 56 to ensure a tight fit therebetween. Similarly, the receiving portion 50 may define substantially the same or different shape as the front opening 20.

According to another embodiment, the receiving diameter $D_5$ may be different than the rear diameter $D_2$ of the front opening 20, such that the diameter suddenly increases or decreases moving from the rear edge 60 of the front opening 20 to the front edge 64 of the receiving portion 50. According to yet another embodiment, the receiving diameter $D_5$ may vary between the front edge 64 and the rear edge 66 and/or the front diameter $D_3$ may be different than the rear diameter $D_4$. For example, the receiving diameter $D_5$ may decrease moving away from the front edge 64 toward the rear edge 66, such that the receiving portion 50 is configured to engage the plug 56 as the plug 56 is inserted therein, with a press-fit arrangement. Specifically, the plug 56 will be further inserted into the receiving portion 50 until it engages the receiving wall 68 and a portion of the plug 56 is compressed by the receiving wall 68.

Referring still to FIG. 2, the first connector 10 defines an interior portion 70 within the body 12 and formed proximate the rear end 16. The interior portion 70 is configured to provide a void between the first connector 10 and the second connector 30 for electrically connecting the connector assembly 8. While FIG. 2 shows the interior portion 70 formed in just the body 12 of the first connector 10, it should be understood that when the connector assembly 8 is fully assembled, the interior portion 70 extends within both the body 12 of the first connector 10, proximate the rear end 16, and the body 32 of the second connector 30, proximate the rear end 36. The interior portion 70 may include at least a portion of the cavities 18, 38 (e.g., at the connecting portion 52 thereof). In this or other configurations, the interior portion 70 is defined within the bodies 12, 32, between the front end 14 of the first connector 10 and the rear end 36 of the second connector 30.

The first connector 10 may sealingly engage the second connector 30 to seal and protect the interior portion 70 of the connector assembly 8, including the electrical connection of the terminals in each of the first and second connectors 10, 30. For providing a waterproof connector assembly 8, the terminals may be further sealed within the cavities 18, 38 proximate the front openings 20 to prevent moisture from entering the interior portion 70 of the connector assembly 8.

An arm 72 extends from the body 12, proximate the rear edge 66 of the receiving portion 50, toward the rear end 16 of the first connector 10. The connecting portion 52 is defined between the arm 72 and the body 12. As shown in FIG. 2, the connecting portion 52 is defined between the arm 72 and the upper surface 15 of the body 12. A horn 74 extends from the arm 72 (e.g., proximate a rear end 76 of the arm 72. The horn 74 may be angled toward the rear end 16 of the first connector 10 and away from the front end 14. In this configuration, when the terminal or other structure is inserted into the cavity 18, at least a portion of the terminal may positively engage the horn 74. A channel 78 is defined between the arm 72 (e.g., at a side opposing the horn 74) and the lower surface 17 of the body 12. The arm 72 is configured to deflect (e.g., under plastic deformation) away from the upper surface 15 of the body 12, and into the channel 78. For example, when the terminal is inserted into the cavity 18, the terminal engages the horn 74 and causes the arm 72 to deflect as described. When the terminal is fully inserted into the cavity 18, the arm 72 returns to its original position and a complementary feature of the terminal positively engages the horn 74, such that the horn 74 provides an interference fit, preventing the terminal from being withdrawn from the cavity 18. According to other embodiments, the horn 74 may be configured to engage a corresponding feature in a conventional plug in order to positively retain the conventional plug in the cavity 18. In this configuration, the first connector 10 is configured to interchangeably receive either a conventional plug or the plug 56 described in the present application, reducing the number of parts required depending on the plug being used in a particular assembly.

While FIG. 2 shows the connecting portion 52 defined between the arm 72 and the upper surface 15 of the first connector, according to other embodiments, the cavity 18 may extend proximate the lower surface 17, such that the connecting portion 52 is defined between the arm 72 and the lower surface 17. Similarly, in this configuration, the channel 78 may be defined between the upper surface 15 and the arm 72, such that the arm 72 is configured to deflect away from the lower surface 17 toward the upper surface 15 when the terminal or other structure engages the horn 74. According to other embodiments, the arm 72 may deflect when the terminal engages other portions of the arm 72.

The connecting portion 52 defines a cross-sectional area that is less than the cross-sectional area of the receiving portion 50. The transition portion 54 of the cavity 18 defines a taper with decreasing cross-sectional area moving away from the receiving portion 50 toward the connecting portion 52. The transition portion 54 and/or the connecting portion 52 may define a substantially circular profile, such that the diameter of the cavity 18 decreases in the transition portion 54. According to other embodiments, the connecting portion 52 defines other profile shapes and the transition portion 54 provides a smooth transition between the circular profile shape of the receiving portion 50 and the non-circular profile of the connecting portion 52.

Referring still to FIG. 2, the plug 56 is shown according to one embodiment. The plug 56 includes a substantially annular body 80 having a first end 82, configured to be received in the cavity 18 through the front opening 20, and an opposing second end 84. The body 80 defines a plug diameter $D_6$ (i.e., a sixth diameter), which is substantially the same as or less than the receiving diameter $D_5$, such that the body 80 may be disposed in the receiving portion 50 of the cavity 18. While FIG. 2 shows the plug 56 having an annular body 80, it should be understood that according to other embodiments, the body 80 may have other shapes corresponding to and substantially the same as the shape of the receiving portion 50.

Figure 3:
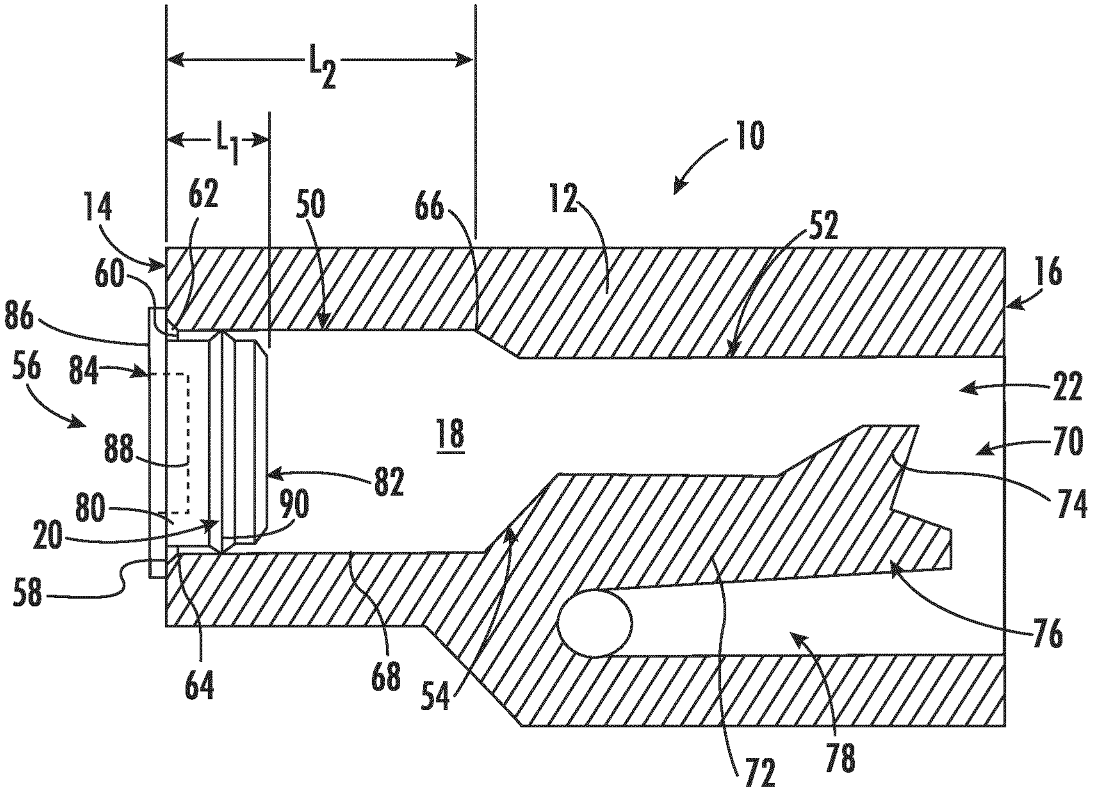
FIG. 3 is an assembled cross-sectional view of the connector of FIG. 2.

A cap 86 is formed at the second end 84 and extends radially outward from the body 80. The cap 86 defines a cap diameter $D_7$ (i.e., a seventh diameter), which is greater than the plug diameter $D_6$ and the front diameter $D_1$ of the front opening 20. Referring now to FIG. 3, when the plug 56 is inserted into the receiving portion 50 of the cavity 18, the cap 86 is disposed against and engages the front end 14 of the first connector 10. Due to the difference in diameter between the front diameter $D_1$ and the cap diameter $D_7$, the cap 86 completely conceals the corresponding cavity 18 from view when the plug 56 is installed in the cavity 18.

Referring again to FIG. 2, an inset portion 88 (e.g., a bore) is defined in the cap 86 and extends axially into the body 80. It should be understood that the term "axially," as used herein, may refer to the direction extending between the first end 82 and the second end 84 of the body 80, and similarly, by the receiving portion 50 of the cavity 18. The inset portion 88 may define a profile configured to engage a tool, such that the tool may hold the plug 56 for alignment with and insertion into the cavity 18. For example, the inset portion 88 may have a hexagonal shape, may be a slot, or may define other profile shapes, which are configured to receive tools having corresponding shapes. According to another embodiment, the cap 86 may be substantially flat and may not include an inset portion 88.

The plug 56 includes a collar 90, which extends radially outward from the body 80 between the first end 82 and the cap 86. The collar 90 defines a collar diameter $D_5$ (i.e., an eighth diameter), which is approximately the same as the receiving diameter $D_5$. For example, the collar diameter $D_5$ may be substantially the same as or greater than the receiving diameter $D_5$, such that the collar 90 is configured to frictionally engage the receiving wall 68 when the plug 56 is inserted into the cavity 18. As shown in FIG. 2, the collar 90 forms a point at the collar diameter $D_5$ and is tapered inward moving toward both the first end 82 and the second end 84 of the plug 56. According to other embodiments, the collar 90 may only be tapered inwardly in one direction (e.g., toward the first end 82 or toward the second end 84). Similarly, the first end 82 of the plug 56 may define a bevel, which improves the ability to locate the first end 82 of the plug 56 in the front opening 20 of the cavity 18.

While FIG. 2 shows the plug 56, including the collar 90 having an annular profile, according to other embodiments, the plug 56 and/or the collar 90 may have other profiles. Specifically, portions of the cavity 18 (e.g., the receiving portion 50) may define a profile that is not annular (e.g., square, rectangular, etc.). In this configuration, one or both of the plug 56 itself or the collar 90 more specifically defines an outer profile that is complementary to or the same as the profile of the cavity 18 or more specifically of the receiving wall 68 forming the receiving portion 50, such that the plug 56 may be received in the cavity 18. Similarly, the outer profile of the collar 90 may be complementary to the profile of the surface 62 forming the front opening 20.

Referring now to FIG. 3, the first connector 10 is shown with the plug 56 inserted into the cavity 18. As shown in FIG. 3, the collar diameter $D_8$ is substantially the same as the receiving diameter $D_5$. In this configuration, as the plug 56 moves axially into the receiving portion 50 of the cavity 18, friction between the collar 90 and the receiving wall 68 limits or prevents movement of the plug 56 within the cavity 18 without applying an outside force on the plug 56.

According to another embodiment, when the collar diameter $D_8$ is greater than the receiving diameter $D_5$, the collar 90 engages the surface 62 of the front opening 20, which thereby causes the collar 90 to deflect or deform (e.g., bend and/or compress) under plastic deformation. As the plug 56 is fully inserted in to the cavity 18 and the collar 90 engages the receiving wall 68, the normal force between the collar 90 and the receiving wall 68 increases friction therebetween, such that the plug 56 is press-fit in the receiving portion 50 of the cavity 18, thereby limiting movement of the plug 56 without applying an outside force on the plug 56. The taper of the collar 90 reduces the amount of material present at an outer periphery of the collar 90, thereby reducing the rigidity of the collar 90 and enabling the collar 90 to plastically deform when it engages the front opening 20 and the receiving wall 68.

Once the plug 56 is fully inserted into the cavity 18 and at least a portion of the plug 56 engages the first connector 10, the plug 56 is ultrasonically welded to the first connector 10. High-frequency sound waves (i.e., acoustic vibrations) are applied to at least one of the plug 56 or the first connector 10, which are both formed from plastic. The vibration of the plug 56 and the first connector 10 relative to each other causes frictional heat therebetween, melting a portion of the plastic of one or both of the plug 56 or the first connector 10 where the plug 56 engages the first connector 10. When the vibrations are stopped, the melted plastic cools and solidifies, forming a hardened plastic coupling the plug 56 to the first connector 10. According to one embodiment, each of the plug 56 and the first connector 10 are formed from the same plastic material, such that both the plug 56 and the first connector 10 have the same melting point. In this configuration, both the plug 56 and the first connector 10 melt where the plug 56 engages the first connector 10. According to another embodiment, the plug 56 may be formed from a different plastic material with a lower melting point than the first connector 10, such that the plug 56 melts during the ultrasonic welding process before or instead of the first connector 10.

As discussed above, in the configuration shown in FIG. 3, the collar 90 engages receiving wall 68. In this configuration, during the ultrasonic welding process, the collar 90 melts and/or a portion of the receiving wall 68 melts and the collar 90 is coupled directly to the receiving wall 68. The collar 90 may be ultrasonically welded to the receiving wall 68 at specific discrete (i.e., separate) points along the outer periphery of the collar 90. In this configuration, the press-fit between the collar 90 and the receiving portion 50 may provide a watertight seal therebetween, preventing moisture from entering the interior portion 70, and the ultrasonic weld prevents the plug 56 from moving axially in the receiving portion 50 or being removed from the cavity 18 by vibrations or other external forces. According to another embodiment, the ultrasonic weld may be formed around substantially the entire outer periphery of the collar 90, such that the weld itself forms a watertight seal between the collar 90 and the receiving wall 68.

According to another embodiment, the cap 86 is integrally formed with the rest of the plug 56 from the same plastic material. At least a portion of one of the cap 86 and/or the front end 14 of the first connector 10 melts during the ultrasonic welding process, such that the cap 86 is coupled directly to the front end 14 and the plug 56 is coupled to the first connector 10 at an outer surface of the first connector 10. According to other embodiments, the plug 56 may be ultrasonically welded to the first connector 10 in more than one location. At each of these locations, the weld may be formed at discrete points to prevent movement of the plug 56 without the weld itself forming a seal. According to other embodiments, the weld may be formed annularly around substantially the entire plug 56, such that the weld forms a watertight seal between the plug 56 and the first connector 10.

While the plug 56 may be plastically welded to the first connector 10 with ultrasonic welding, it should be recognized that the plug 56 may be welded to the first connector 10 in other ways. For example, the plug 56 may be rotated within the cavity 18 to generate friction between the collar 90 and the receiving wall 68, which in turn increases the temperature of one or both of the collar 90 and the receiving wall 68, until plastic forming at least one of the collar 90 and the receiving wall 68 melts. The assembly 8 then cools, as in ultrasonic welding, and the plug 56 is coupled to the receiving wall 68 with a plastic weld. In this configuration, the larger the collar diameter $D_8$ relative to the receiving diameter $D_5$, the greater the frictional force between the collar 90 and the receiving wall 68, which increases the heat output from friction during rotation and accelerates melting the plastic. Similarly, friction between the rotating cap 86 and the front end 14 of the first connector 10 may form a plastic weld therebetween, as discussed above with respect to ultrasonic welding. A tool may engage the inset portion 88 of the plug 56 in order to quickly rotate the plug 56 within the cavity 18.

Referring still to FIG. 3, the plug 56 defines a plug length $L_1$ (i.e., a first length) measured from the cap 86 to the first end 82 of the plug 56. The cavity 18 defines a receiving length $L_2$ (i.e., a second length), measured from the front end 14 of the first connector 10 to the rear edge 66 of the receiving portion 50. As shown in FIG. 3, the plug length $L_1$ is less than the receiving length $L_2$. Specifically, the plug length $L_1$ may be less than half of the receiving length $L_2$. Notably, the smaller the plug length $L_1$, the less material is required to form the plug 56, thereby reducing material costs for the connector assembly 8. A conventional plug would require a member to extend from the first end of the plug all the way into the connecting portion 52 of the cavity 18 in order to positively engage a corresponding feature in the cavity (e.g., the horn 74). In contrast, the ultrasonic weld between the plug 56 and the first connector 10 provides positive engagement between the plug 56 and the first connector 10, thereby minimizing material use and cost for the connector assembly 8.

Figure 4:
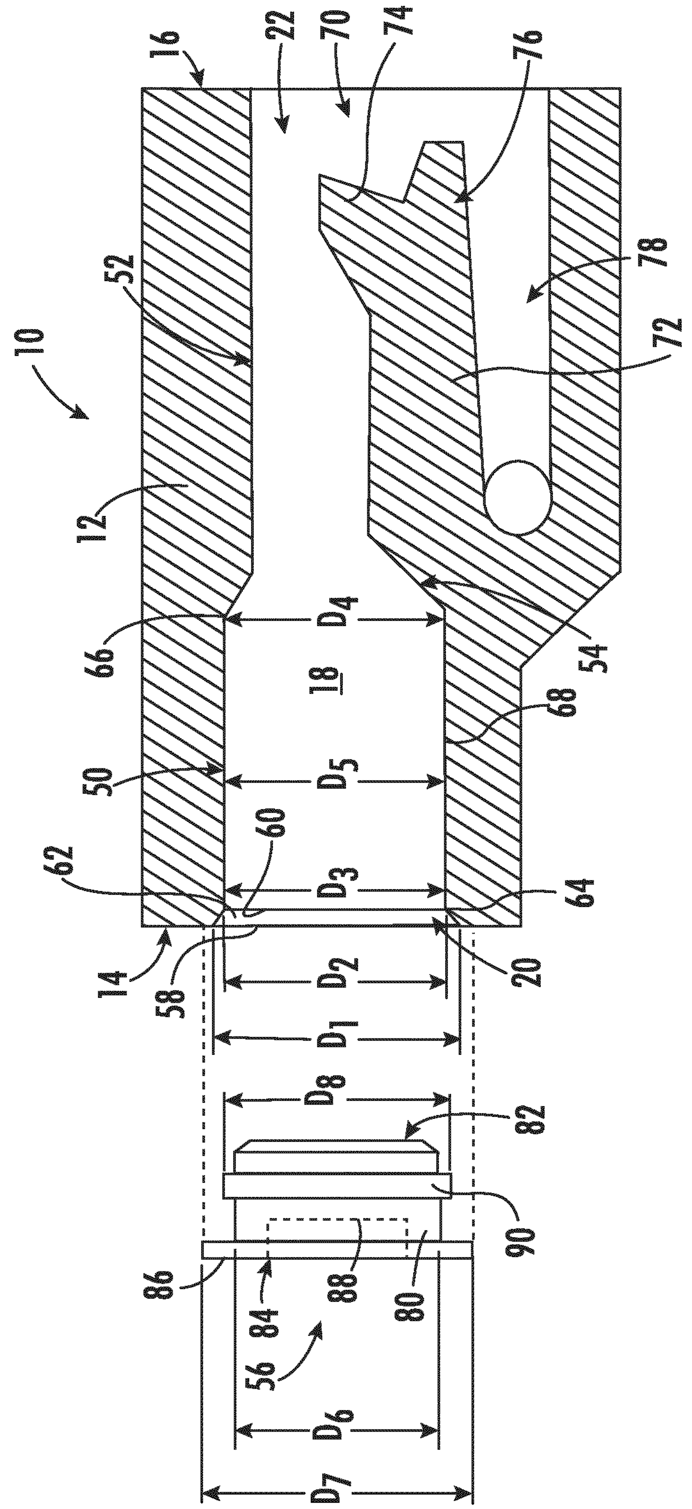
FIG. 4 is an exploded cross-sectional view of a connector according to another embodiment, including a plug for sealing the connector.
Figure 5:
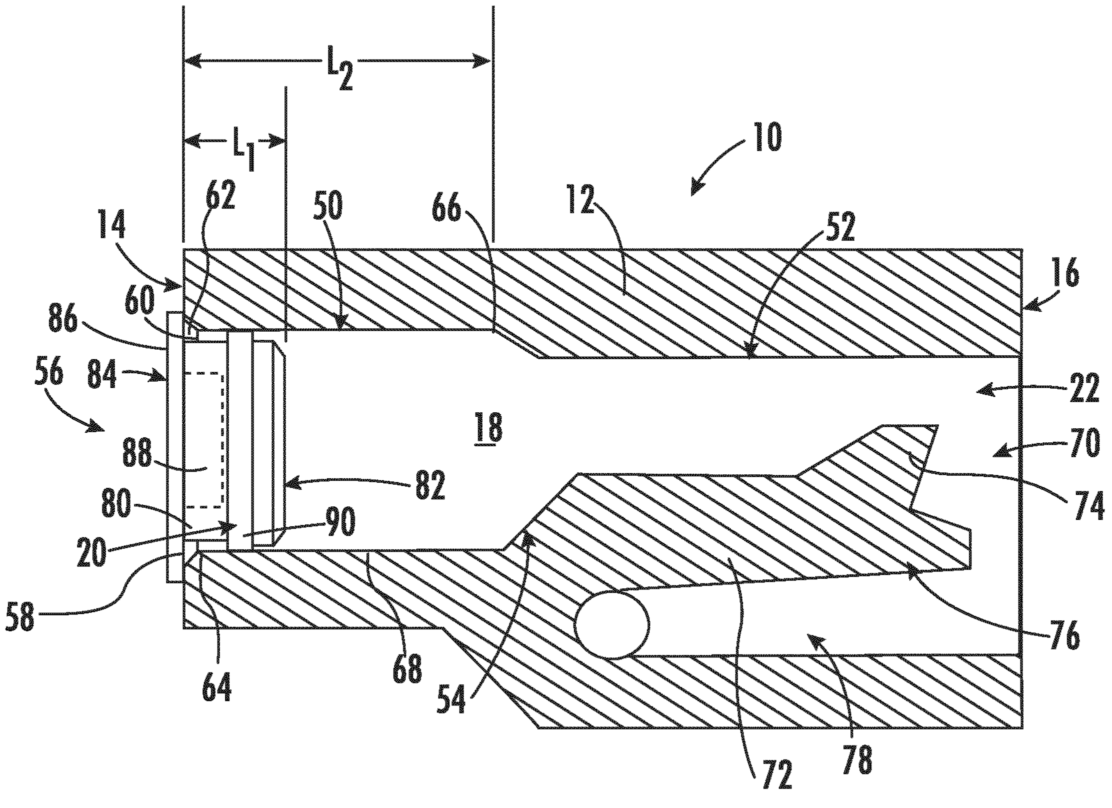
FIG. 5 is an assembled cross-sectional view of the connector of FIG. 4.

Referring now to FIG. 4, the plug 56 is shown according to another embodiment. The plug 56 is substantially the same as the plug 56 shown in FIGS. 2 and 3. However, as shown in FIG. 4, the collar 90 defines a substantially annular (i.e., cylindrical) shape having rectangular cross-sectional profile, defining a flat outer periphery. In this configuration, the thickness of the collar 90 at the outer periphery limits the deformation of the collar 90 when it engages the receiving wall 68. Referring to FIG. 5, in order to avoid damage to the collar 90, the collar diameter $D_5$ may be substantially the same as the receiving diameter $D_5$. In this configuration, the surface area available at an outer periphery of the collar 90 for ultrasonically welding the collar 90 to the receiving wall 68 is greater than with a tapered collar 90. By increasing the available surface area, the vibrations in the ultrasonic welding process do not need to be applied as precisely to a specific portion of the collar 90 (e.g., the pointed edge of the tapered collar 90) to ensure that the plug 56 is welded to the receiving wall 68. Similarly, while FIGS. 3 and 5 show the collar 90 engaging the receiving wall 68, according to another embodiment, the plug 56 may be formed without a collar 90. In this configuration, the plug diameter $D_6$ is substantially the same as the receiving diameter $D_5$ and the body 80 is disposed directly against and is ultrasonically welded to the receiving wall 68.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., “top,” “bottom,” “above,” “below,” etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An assembly comprising:

a plug configured to be at least partially disposed in a cavity of a connector at a front end of the connector, the plug coupled to the connector in a configuration, the plug comprising:

a body comprising a first end and a second end located opposite the first end, the first end insertable into the cavity of the connector;

an inset portion extending axially into the second end of the body, the inset portion forming a recess within the inset portion, the recess having a first closed surface forming an outer surface and configured to engage with a tool for aligning the plug with the cavity; and a collar formed annularly about the body and having a diameter, the collar configured to engage a receiving wall of the connector, the collar having a sloped surface extending towards the first end configured to interface with the receiving wall having a complementary sloped surface, the receiving wall having an outer edge diameter which matches the diameter of the collar and is greater than an interior diameter of the cavity;

wherein the plug encloses the cavity with a second closed surface of the first end, such that the cavity is free from receiving a terminal or an electrical wire in the configuration.

2. The electrical connector assembly of claim 1, further comprising the connector.

3. The electrical connector assembly of claim 2, wherein the connector defines a front end and an opposing rear end, the connector having a plurality of cavities defined therein, each of the plurality of cavities extending from the front end to the rear end and configured to receive at least one of the terminal or the electrical wire therein.

4. The electrical connector assembly of claim 1, wherein the first end of the plug is at least partially disposed in the cavity of the connector and the second end is opposite the first end, and wherein a cap is formed at the second end and extends annularly outward from the body.

5. The electrical connector assembly of claim 4, wherein the cap is disposed against and engages the front end of the connector when the plug is disposed in the cavity of the connector.

6. The electrical connector assembly of claim 4, wherein the plug defines a plug length measured from the cap to the first end, wherein the cavity defines a cavity length, and wherein the plug length is substantially half the cavity length.

7. The electrical connector assembly of claim 1, wherein the collar is ultrasonically welded to the connector.

8. The electrical connector assembly of claim 7, wherein the sloped surface of the collar defines an outer profile complementary to a profile of the receiving wall.

9. The electrical connector assembly of claim 7, wherein the collar comprises a second taper extending toward the second end of the body.

10. The electrical connector assembly of claim 9, wherein a point is formed between the first taper and the second taper, and wherein at least a portion of the point engages the receiving wall.

11. A connector assembly, comprising:

a plug configured to be at least partially disposed in a cavity of a connector at a front end of the connector, the plug coupled to the connector in a configuration, the plug comprising:

a body comprising a first end and a second end;

the first end at least partially disposed in the cavity of the connector;

the second end opposite the first end;

an inset portion extending axially into the second end of the body, the inset portion forming a recess within the inset portion, the recess having a first closed surface forming an outer surface and configured to engage with a tool for aligning the plug with the cavity, wherein the plug encloses the cavity with a second closed surface of the first end, such that the cavity is free from receiving a terminal or an electrical wire in the configuration;

a cap formed at the second end and extending annularly outward from the body; and a collar formed annularly about the body, the collar configured to engage a receiving wall of the connector, the collar having a sloped surface extending towards the first end configured to interface with the receiving wall having a complementary sloped surface.

12. The connector assembly of claim 11, further comprising the connector, the connector defining the front end and an opposing rear end, the connector having a plurality of cavities defined therein.

13. The connector assembly of claim 11, wherein the collar defines a collar diameter, and wherein the collar diameter is substantially the same or greater than a receiving portion diameter defined by the receiving wall.

14. The connector assembly of claim 13, wherein the collar is ultrasonically welded to the receiving wall.

15. The connector assembly of claim 11, wherein the inset portion extends axially into the body of the plug from the cap.

16. A method of assembling an electrical connector assembly, the method comprising:

providing a connector defining a front end, an opposing rear end, and a cavity defined in the connector and extending from the front end to the rear end, inserting a plug at least partially into the cavity, the plug comprising:

a body comprising a first end and a second end located opposite the first end, the first end insertable into the cavity of the connector;

an inset portion extending axially into the second end of the body, the inset portion forming a recess within the inset portion, the recess having a first closed surface forming an outer surface and configured to engage with a tool for aligning the plug with the cavity, wherein the plug encloses the cavity with a second closed surface of the first end, such that the cavity is free from receiving a terminal or an electrical wire in the configuration; and a collar formed annularly about the body and having a diameter, the collar configured to engage a receiving wall of the connector, the collar having a sloped surface extending towards the first end configured to interface with the receiving wall having a complementary sloped surface, the receiving wall having an outer edge diameter which matches the diameter of the collar and is greater than an interior diameter of the cavity; and coupling the plug to the connector.

17. The method of claim 16, wherein:

the step of coupling the plug to the connector further comprises ultrasonically welding the collar to the receiving wall.

18. The method of claim 17, further comprising engaging the collar and the receiving portion with a press fit.

19. The method of claim 16, wherein:

the second end of the plug is opposite the first end of the plug;

the body of the plug comprises a cap extending radially outward from the second end; and the step of coupling the plug to the connector further comprises ultrasonically welding the cap to the front end of the connector.

* * * * *